United States Patent
Goodman et al.

(10) Patent No.: US 7,665,107 B2
(45) Date of Patent: Feb. 16, 2010

(54) VIRAL ADVERTISING FOR INTERACTIVE SERVICES

(75) Inventors: Joshua T. Goodman, Redmond, WA (US); Christopher A. Meek, Kirkland, WA (US); Carl M. Kadie, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 788 days.

(21) Appl. No.: 11/078,555

(22) Filed: Mar. 11, 2005

(65) Prior Publication Data

US 2006/0218577 A1     Sep. 28, 2006

(51) Int. Cl.
*H04N 7/10* (2006.01)
(52) U.S. Cl. .............................. 725/34; 725/32; 725/42; 725/45; 725/46
(58) Field of Classification Search .................. 725/32, 725/34, 42–46
See application file for complete search history.

(56) References Cited

U.S. PATENT DOCUMENTS

| | | | |
|---|---|---|---|
| 2002/0184630 A1* | 12/2002 | Nishizawa et al. | 725/44 |
| 2004/0194130 A1* | 9/2004 | Konig et al. | 725/32 |
| 2005/0283791 A1* | 12/2005 | McCarthy et al. | 725/1 |
| 2006/0010470 A1* | 1/2006 | Kurosaki et al. | 725/46 |
| 2006/0059518 A1* | 3/2006 | Czuchry et al. | 725/46 |
| 2006/0218576 A1* | 9/2006 | Johnson et al. | 725/32 |
| 2008/0059997 A1* | 3/2008 | Plotnick et al. | 725/32 |
| 2008/0256583 A1* | 10/2008 | Liwerant et al. | 725/112 |

* cited by examiner

*Primary Examiner*—Christopher Kelley
*Assistant Examiner*—Charles N Hicks
(74) *Attorney, Agent, or Firm*—Lee & Hayes, PLLC

(57) ABSTRACT

The subject invention provides a unique system and method that facilitates propagating selected advertisements among users of interactive services. Interactive service users can be targeted for specific types of advertisements for particular products or services. When a user selects at least one advertisement for more detailed viewing, the advertisement can be distributed to or shared with one or more other users. These other users may be part of the original user's social network. Thus user-selected advertisements can be shared among users who are familiar with each other's current or future interests. In some cases, user-selected advertisements can replace system-selected advertisements. As a result, advertisers can benefit from increased exposure of and interest in their advertisements.

23 Claims, 9 Drawing Sheets

VIRAL ADVERTISING FOR INTERACTIVE SERVICES

TECHNICAL FIELD

The subject invention relates generally to online advertising and in particular, to targeted advertising at least in part by propagating selected advertisements from one user to at least a subset of the user's social network.

BACKGROUND OF THE INVENTION

Advertising in general is a key revenue source in just about any commercial market. To reach as many consumers as possible, advertisements are typically presented via billboards, television, radio, and print media such as newspapers and magazines. However, with the advent and rise of the Internet, advertisers have found a new and perhaps less expensive medium for reaching vast numbers of potential customers across a large and diverse geographic span. Advertisements on the Internet can primarily be seen on web pages or web sites as well as in pop-up windows when a particular site is visited. However, businesses interested in increasing revenues continue to look for new techniques of disseminating advertisements to Internet users.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to a system and/or methodology that facilitate propagating selected advertisements among users within a social network. The invention provides for the distribution of one or more advertisements to one or more users which have been selected by another (or different) user. In particular, such distribution can be triggered by the selection for more detailed viewing by a first user. For example, when a user is presented with an advertisement and then clicks on the advertisement to obtain more information about the product or service being advertised, the act of clicking on the advertisement can cause it to be sent to one or more other users for their viewing. The other users may be part of the first user's social network and/or may be actively or currently communicating with the first user such as by way of a chat, game, or instant messaging service.

According to one aspect of the invention, the first user can be notified when an advertisement is shared with other users (e.g., at least a second user). In addition, a notification can be received when a shared advertisement is clicked on for more detailed viewing by the second user. The notification can be in the form of a message to the first user such as by a pop-up mechanism or via a messaging system (e.g., email, instant message, etc.). Alternatively, the particular advertisement can be flashed (and appear as flashing) on the first user's display to indicate that the second user has also clicked on the particular advertisement.

Another aspect of the invention provides for managing the distribution of advertisements. More specifically, a rating system can be established that rates advertisements selected by the first user. The rating can be based at least in part on user profile information as well as criteria or preferences set by the first user. Advertisements which satisfy a rating threshold can be distributed to other users.

In yet another aspect of the invention, advertisements selected by the first user can replace system-selected or randomly selected targeted advertisements. For example, instead of presenting the second user with only advertisements selected by an interactive service, advertisements selected by the first user can replace at least a subset of the system-selected advertisements. Thus, the second user can be shown advertisements which are more specific, desirable, or suitable for that user.

Because distributing advertisements between users of the same social network can provide greater exposure of the advertisements, the demand for such advertising may increase beyond its supply. As a result, auction bidding can be employed to sell such advertisement space. Auction bidding can be based at least in part on cost per number of advertisements, cost per click of an advertisement, and/or cost per action (e.g., purchase of advertised good or service). Advertisement space can also be purchased through negotiated prices per advertisement, for example.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
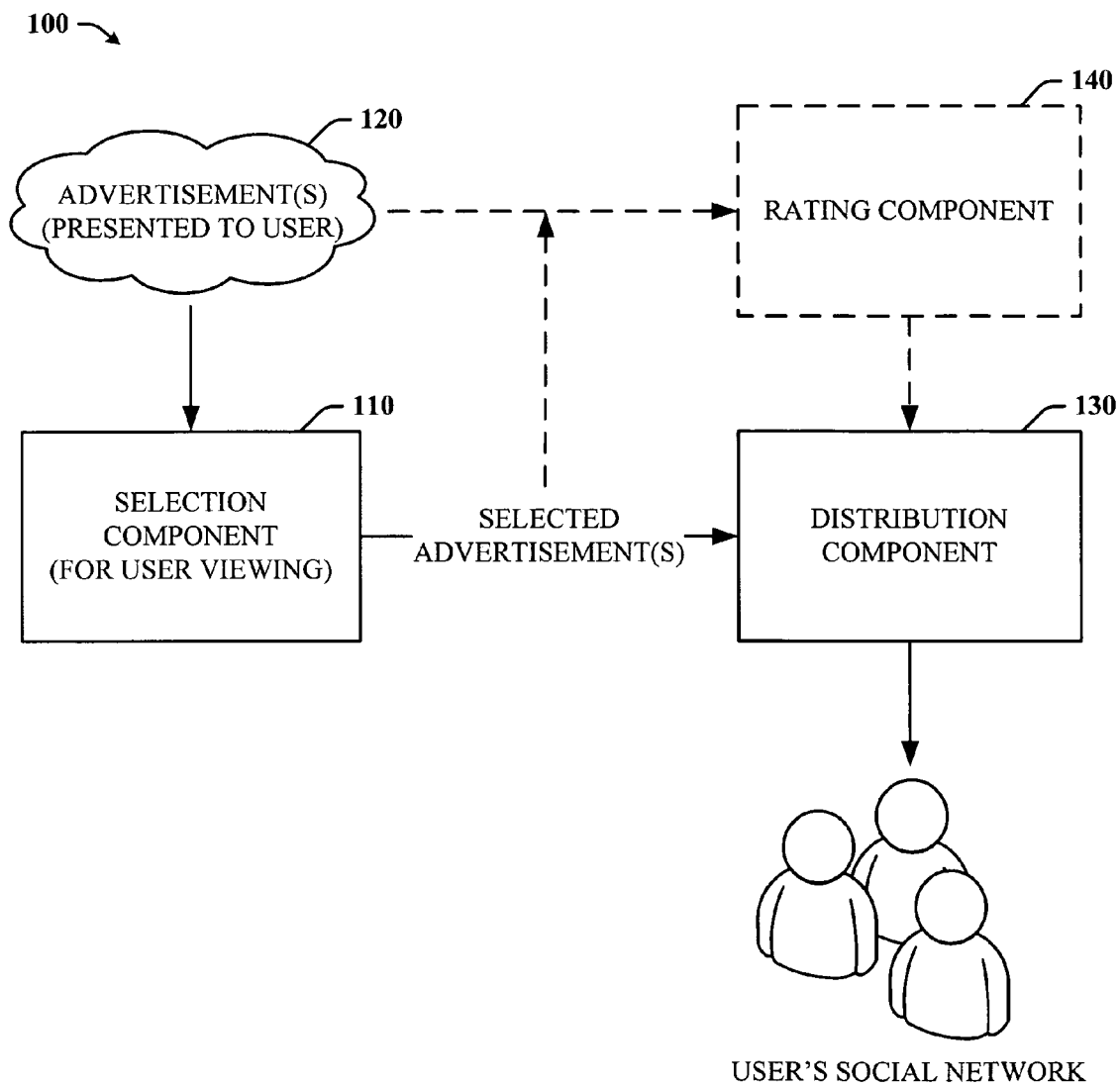
FIG. 1 is a high-level block diagram of an advertisement propagation system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with distributing at least a subset of user-selected advertisements to other users within the same social network. In particular, a set of criteria can be learned and/or updated as necessary to facilitate determining when to distribute or share a user-selected advertisement with one or more other users.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is a general block diagram of an advertisement propagation system 100 that facilitates targeting advertisements to particular users in accordance with an aspect of the subject invention. The system includes a selection component 110 that can be employed by a first user to select at least one advertisement 120 for more detailed viewing. The selection of the at least one advertisement can trigger a distribution component 130 to distribute the selected advertisement to at least a second user within the (first) user's social network. The first user's social network can be determined in part by identifying those who may be currently engaged in communications with the first user such as via a chat, instant message, game, or other interactive service. The first user's contact list and/or address book can also be included to determine the social network. Alternatively, the first user can specify additional users—such as by email address or username—who may receive one or more of its selected advertisements.

The distribution of any advertisement can occur in many different ways. In one approach, an advertisement selected by the first user can be distributed automatically as soon as the first user selects the advertisement. In another approach, the first user can manually share the advertisement with one or more specified users. For instance, after viewing the advertisement and determining that at least one other user he/she knows may also be interested in it, the first user can mark the advertisement for distribution or employ an on-screen control to send the advertisement to the designated users.

To mitigate the volume of advertisements distributed to or shared with other users, a rating system or component 140 can be employed to rate any advertisement before it is shared with the other users. The determined rating can be based at least in part on the current user's profile and/or any other preferences indicated by the user.

Recall that any advertisement selected by a user for additional viewing can be automatically shared with other users. The distribution of such advertisements can also be controlled to only distribute to those users (at least the second user) who are currently engaged in an interactive service (e.g., online game, chat, or instant message service) with the user (first user). In such cases, the rating component can examine the profiles of those users to determine the rating.

Furthermore, the first user may also have information on at least some of the contacts in his/her social network. This information can be analyzed as well. A global rating threshold or a per-contact rating threshold (e.g., a second user may be more particular about advertisement subject matter than a third user) can be set by the first user. When an advertisement is marked for possible distribution and satisfies the particular rating threshold, then that advertisement can be distributed to the respective user(s).

In the alternative, the rating component 140 can be employed independently of the selection component 110. For instance, a user may be presented with one or more advertisements. Without invoking the selection component 110 to view the one or more advertisements in greater detail, the rating component can provide a rating of the advertisements currently on display. Such ratings may or may not be utilized to determine whether advertisements are selected and/or distributed and to whom they should be distributed.

Figure 2:
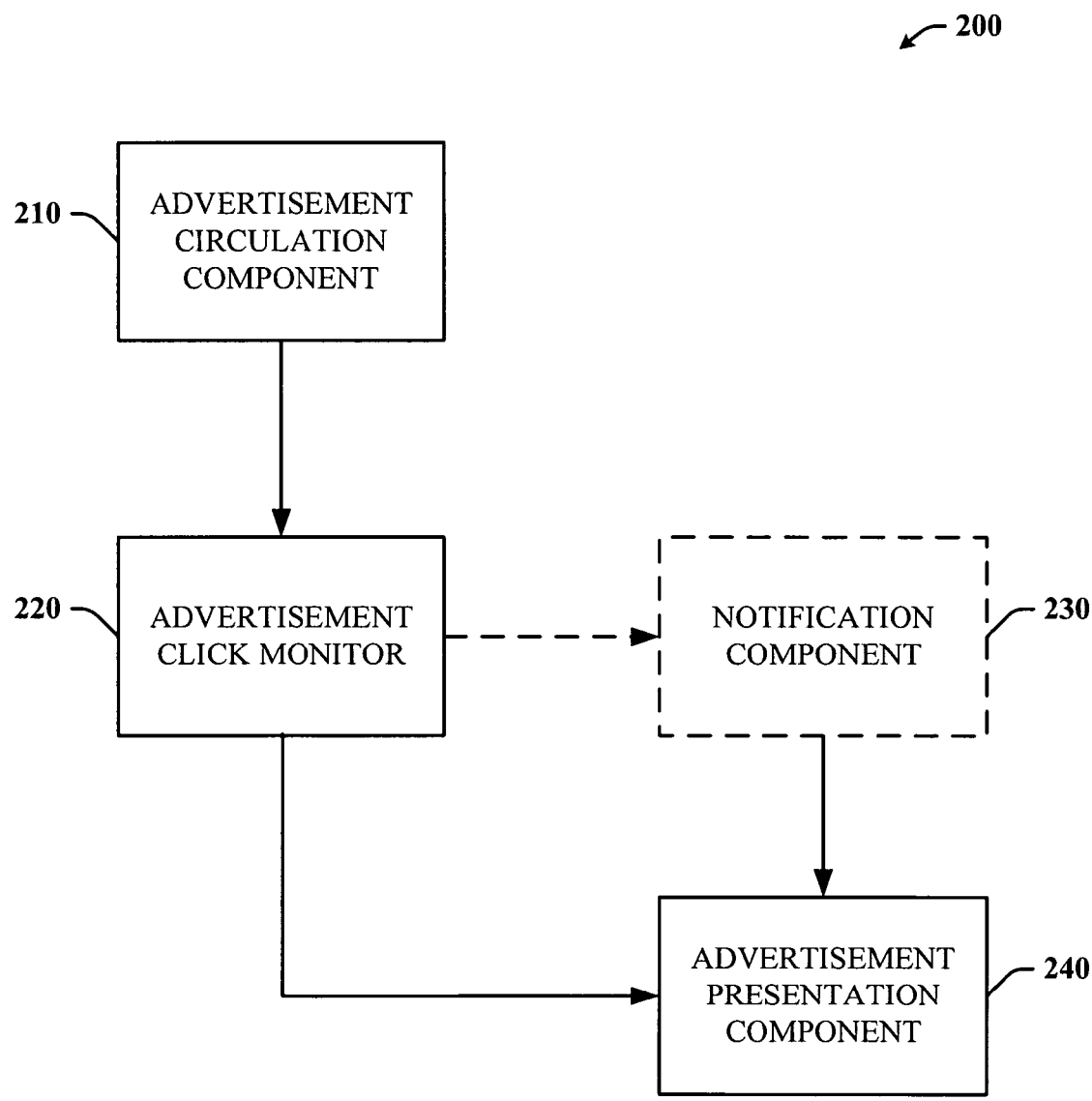
FIG. 2 is a block diagram of an advertisement propagation system that facilitates monitoring of ad-click behavior and providing notification of particular behaviors in accordance with an aspect of the subject invention.

Turning now to FIG. 2, there is a block diagram of an advertisement propagation system 200 that facilitates observing user-interest in selected and/or distributed advertisements among users within a common social network. The system 200 can be employed in at least two approaches. For purposes of this figure, imagine that at least a first and a second user belong to the same social network.

According to one approach, the system 200 includes an advertisement circulation component 210 that can distribute one or more advertisements to one or more users. An advertisement click monitor 220 can watch activity associated with the advertisements and track which of them have been clicked on by at least a first user. When one user has clicked on the advertisement, a notification component 240 can notify at least a second user of the first user's click such as by showing the clicked-on advertisement to the second user or by sending the second user a message (e.g., "FIRST USER has just clicked on an ad for ABC dating services."). The message can be delivered directly to the user's display via a pop-up mechanism or by way of an email, chat, or instant message. In lieu of a message, the advertisement may flash on the second user's display to indicate that someone in the second user's social network has clicked on that advertisement. However, the second user may not receive notification to explain the reason for receiving an advertisement. In this case, the advertisement is simply shown to the second user by way of an advertisement presentation component 240.

In the second approach, suppose that the first user has selected at least one advertisement to view the advertised product or service in more detail. The first user's selection can trigger the selected advertisement to be distributed to at least the second user (or to multiple users within the first user's social network). The click monitor 220 can be employed to monitor for clicks on such advertisement by the second user, for example. If the second user clicks on the advertisement, the first user can be notified via the notification component 230 such as by email, pop-up message, instant message, or chat message.

Alternatively or in addition, the clicked-on advertisement can be presented to the first user via an advertisement presentation component 240. For instance, to indicate that the advertisement presented to the first user was also clicked on by the second user, the notification component 230, operating in concert with the advertisement presentation component 240, can cause the advertisement to flash on the first user's display or can send a message to inform the first user that the second user also showed an interest in the particular advertisement as well.

Figure 3:
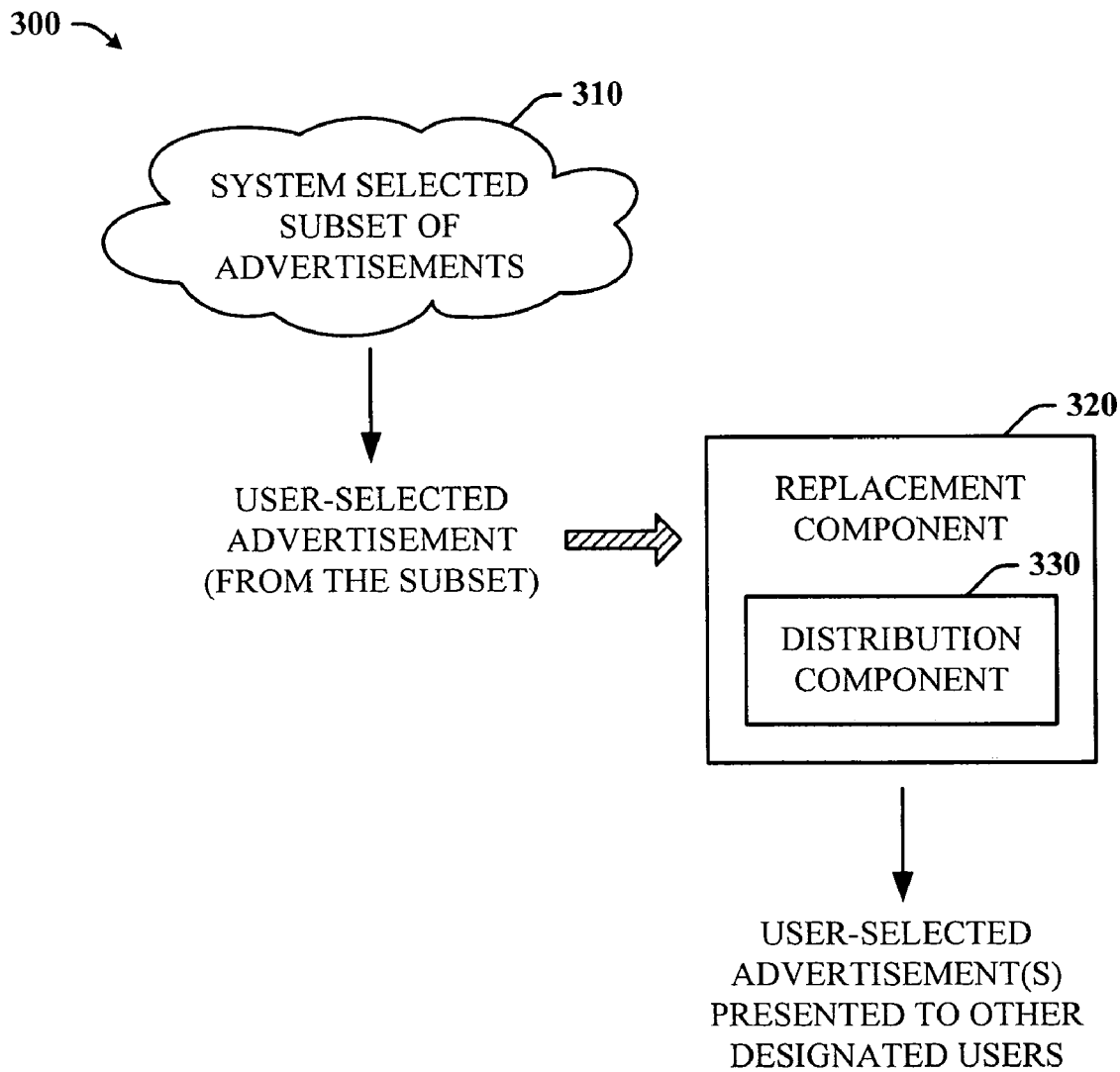
FIG. 3 is a block diagram of an advertisement propagation system that facilitates replacing at least a subset of system-selected advertisements with user-selected advertisements in accordance with an aspect of the subject invention.

In general, advertisements can be selected for presentation to a user based on the user's profile, browser activity, an analysis of recent websites visited by the user, and/or topics mentioned in communication with another user. This selection practice can be referred to as targeted advertising. However, such advertisements may not be in line or coincident with the user's current or future needs. Rather, the user's social or professional contacts may be more aware or familiar with the user's most important interests. In light of this, an advertisement propagation system 300 that facilitates overriding system-selected advertisements with user-selected advertisements is demonstrated in FIG. 3.

As shown in the figure, a user can be presented with any number of system-selected advertisements that were perhaps chosen according to targeted advertising parameters as discussed above. The user can select at least one of the system-selected advertisements 310 which can lead to at least one of two scenarios. In the first, the user is presented with more information about the product or service being advertised (320). In the second, the user's selection of the advertisement marks it as a replacement—for at least a second user. That is, a replacement component 330 can replace a system-selected advertisement that would otherwise have been shown to the second user with the user-selected advertisement. A distribution component 340 can send the replacement to the second user. The second user may or may not be informed that any particular advertisement is either user- or system-selected. When applicable, the user's identity may or may not be revealed to the second user—depending on user preferences and privacy settings.

In practice, for example, imagine that Peter has just written a message about his recent ski trip to his group of friends he enjoys skiing with. The system suggests a default advertisement about ski trips to Vale, as well as three alternatives, including a sale at a store that Peter likes. Peter thinks the ad about the sale would be most interesting, so before clicking "Send", he changes the ad from the system default to the sale about the ad. Moreover, optionally, not only can Peter choose the replacement advertisement, he can also designate which users receive it.

Figure 4:
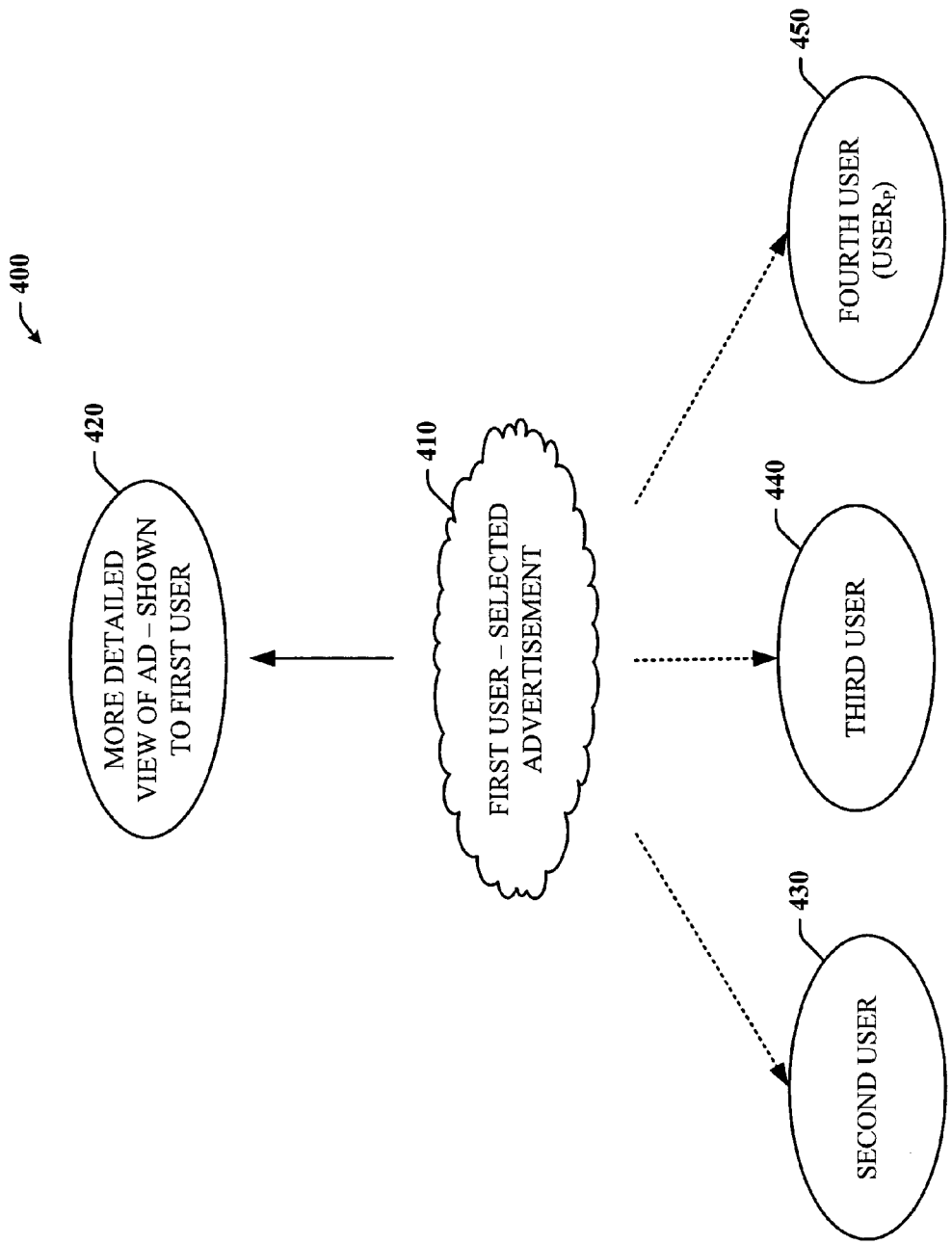
FIG. 4 is a schematic diagram that demonstrates the propagation or distribution of a user-selected advertisement to other users in accordance with an aspect of the subject invention.

Turning now to FIG. 4, there is illustrated a schematic diagram 400 that demonstrates the propagation of at least one advertisement in accordance with an aspect of the subject invention. The diagram 400 depicts an exemplary path that an advertisement can take. Imagine that a user (e.g., first user) is presented with the advertisement (410) and selects it (e.g., by clicking on it) to see more information. Upon selection by the first user, two events can be triggered at about the same time: a more detailed view of the advertisement is presented to the user (420) and the advertisement is distributed to one or more other users (e.g., a second user 430, a third user 440, and/or a fourth user 450 ($USER_P$, where P is an integer greater than one)). Such other users may be a part of the first user's social network.

Consider an example scenario. Peter is in a chat room about skiing. The chat room application contains an "ad" pane where one or more advertisements are displayed to each user. Peter is presented an advertisement for a sale at a store that he likes. He clicks the ad. Peter is presented with additional information about the ad. In one set of circumstances, this advertisement then appears in the chat pane of the other users (replacing or in addition to their previous ads.) Perhaps the ad flashes to alert them that another user has clicked on it. Perhaps the other users receive a message in the chat room (as opposed to the ad pane) alerting them that Peter has clicked on this ad, with a link that they too can click on.

It should be appreciated that each of the other users may also have their own social network which may or may not be different from the first user's social network. When any of the other users selects a "shared or distributed" advertisement for more detailed viewing, the first user can be notified of such selection. In addition, the shared or distributed advertisement can be shared again with other users associated with the second or third users.

In practice, for example, suppose that a first user Bob has shared an advertisement with second user Jane. Jane selects the advertisement for further viewing and Bob receives notification of such. In light of Jane's selection of the advertisement, the advertisement is shared with at least one user—Paul—who is a part of her social network. Paul may or may not be in Bob's social network. Thus, it is possible that the propagation of an advertisement continues indefinitely or until the advertisement is discontinued by the advertiser. To mitigate receiving duplicate advertisements, an advertisement tracking component (not shown) can be employed to block users from receiving the same advertisement within a specified period of time. When this feature is desired by a user, the user can set the period of time in terms of minutes, hours, days, weeks, and/or any other desired time increment or period.

Figure 5:
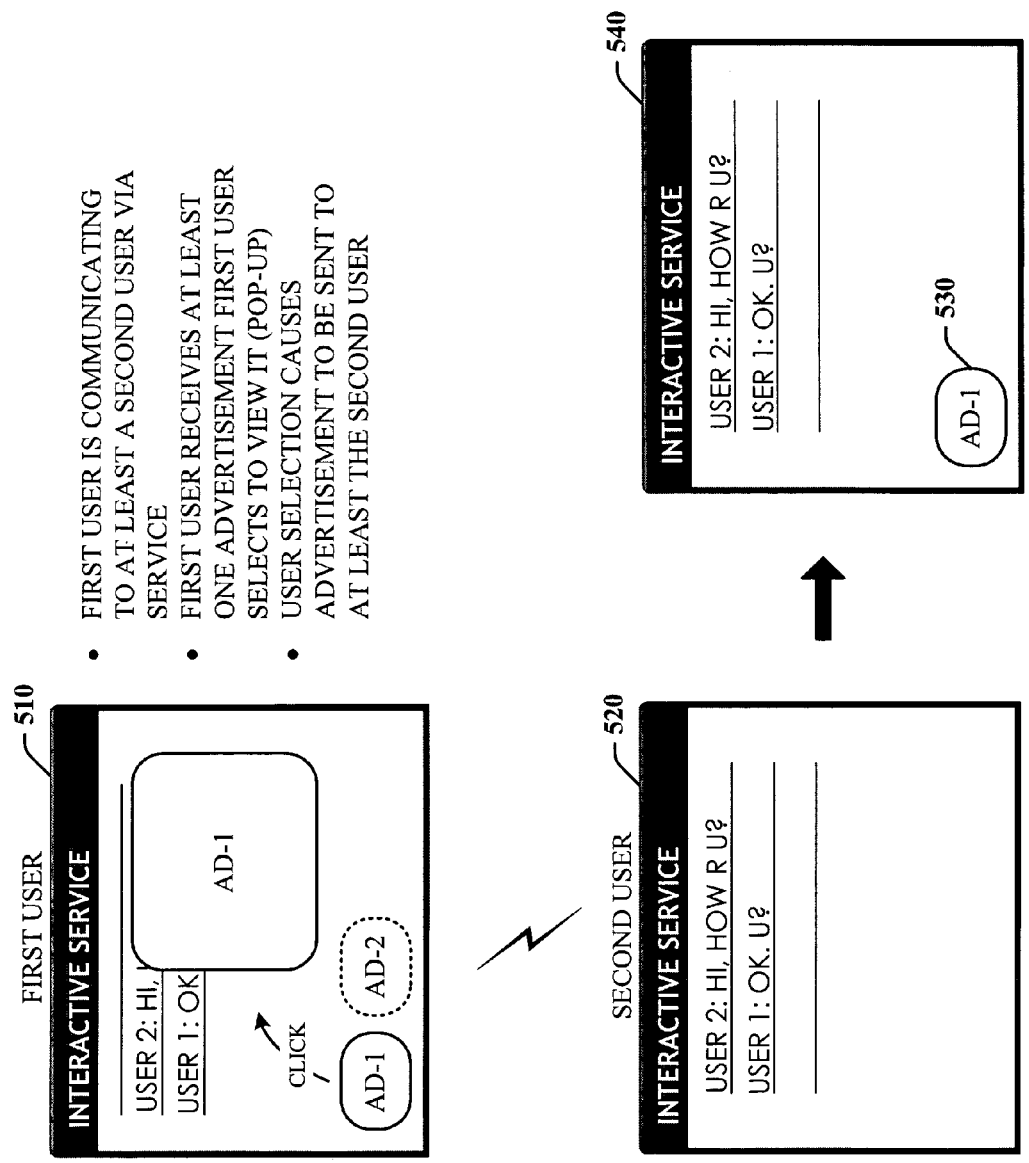
FIG. 5 is a schematic diagram of exemplary user interfaces that illustrate the distribution of a user-selected advertisement among at least one other user within the same social network in accordance with an aspect of the subject invention.

Referring now to FIG. 5, there is illustrated a diagram demonstrating the on-screen appearance of advertisements to users in accordance with an aspect of the subject invention. As indicated in the figure, a first user is communicating with a second user via an interactive chat service and their respective screen displays (510, 520) are shown.

On the first user's display 510, one or more system-selected advertisements (e.g., AD-1, AD-2) is presented to the user. The user selects or clicks on AD-1 for a more detailed view of the advertisement 530. The user's selection triggers the advertisement to be sent or distributed to at least the second user 520. Thus, the second user's display 540 now appears with a pop-up advertisement for AD-1 550.

Various methodologies in accordance with the subject invention will now be described via a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 6:
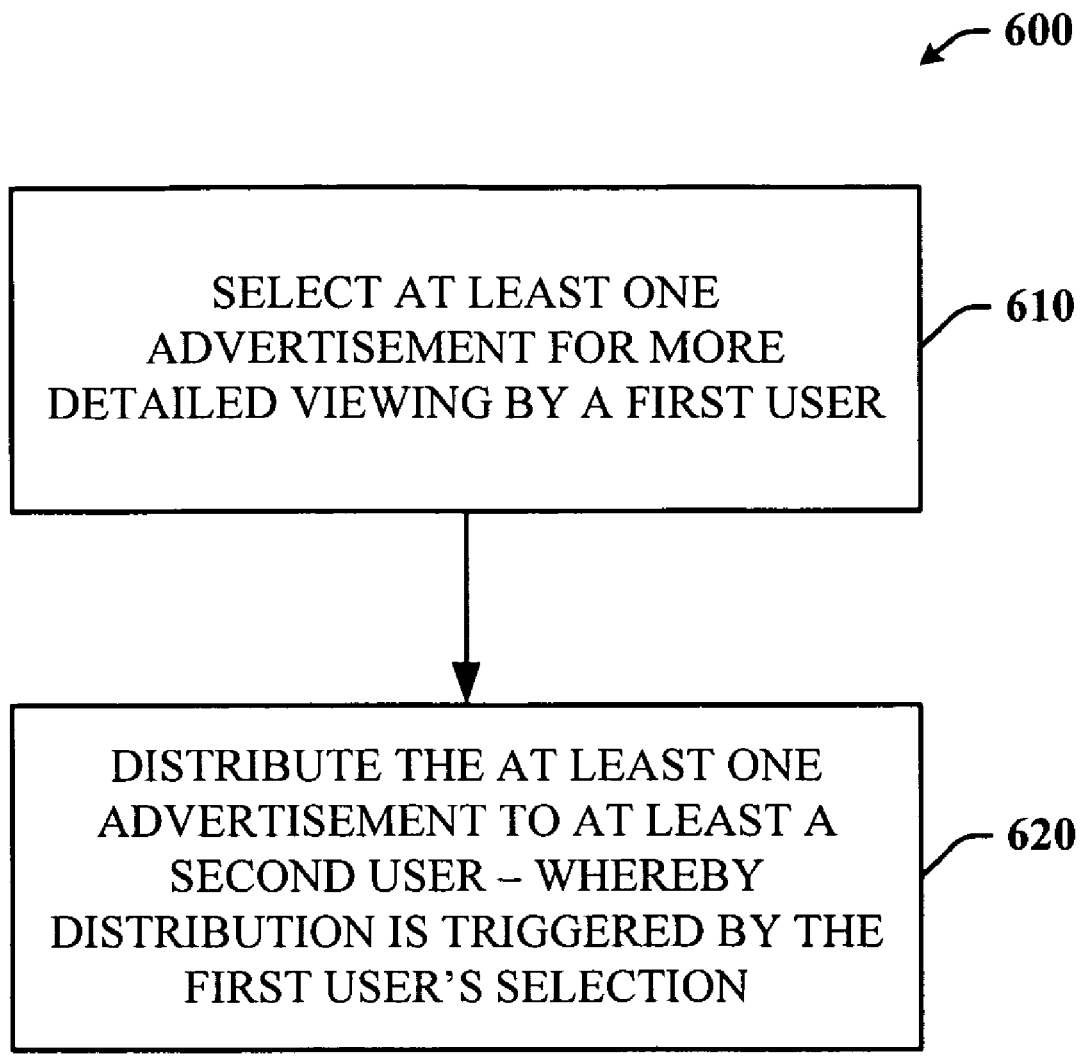
FIG. 6 is a flow chart illustrating an exemplary methodology that facilitates propagating advertisements between users within a social network in accordance with an aspect of the subject invention.

Referring now to FIG. 6, there is a flow diagram of an exemplary method 600 that facilitates the propagation of selected advertisements among users in accordance with an aspect of the subject invention. The method 600 involves selecting at least one advertisement for more detailed viewing at 610. By way of example, a first user may receive a plurality of targeted advertisements and can select at least one advertisement to learn more about a product or service advertised therein. At 620, the at least one advertisement selected by the first user can be distributed to at least a second user, whereby such distribution is triggered by the first user's selection. That is, the first user's selection of any particular advertisement triggers the distribution of that advertisement to at least one other user.

Figure 7:
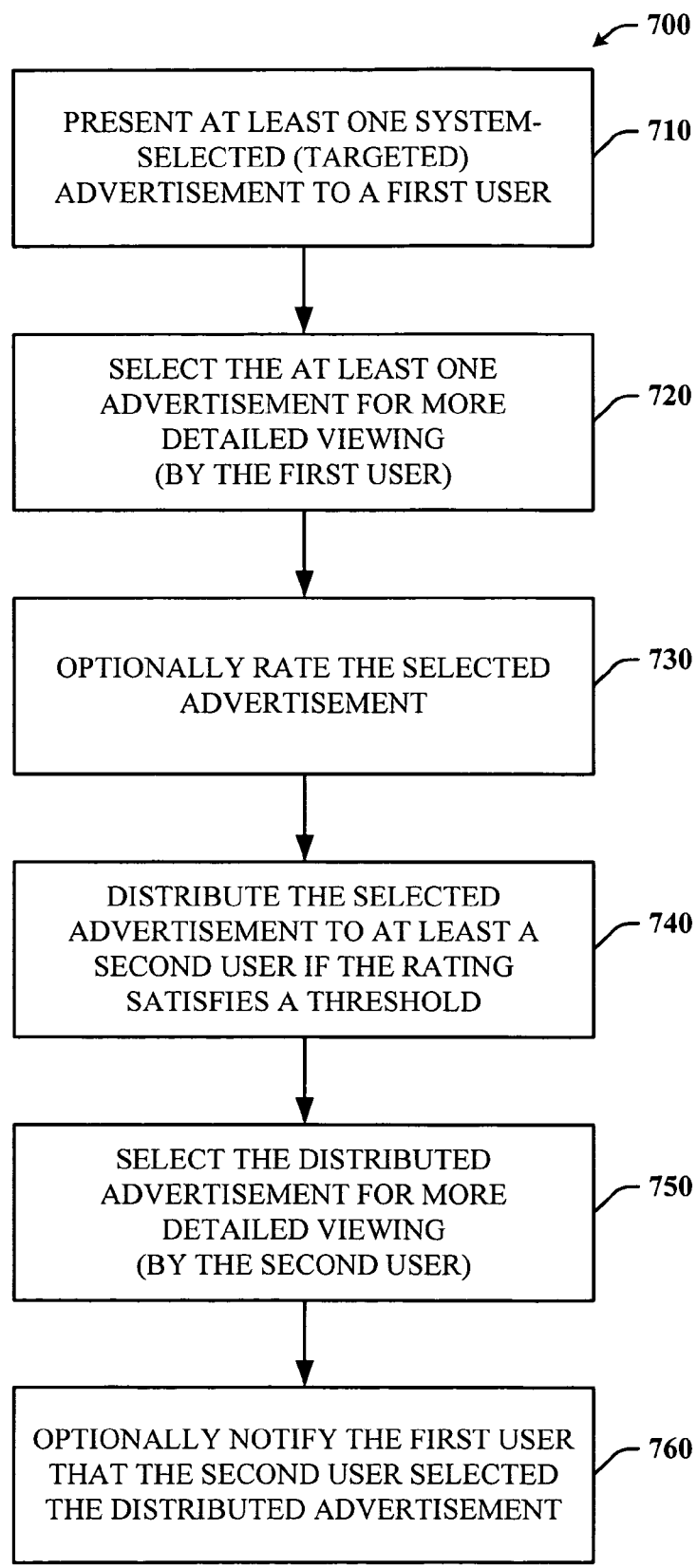
FIG. 7 is a flow chart illustrating an exemplary methodology that facilitates propagating advertisements between users within a social network and providing notification when other users show an interest in a distributed advertisement in accordance with an aspect of the subject invention.

Referring now to FIG. 7, there is a flow diagram of an exemplary method 700 that facilitates distributing at least a subset of selected advertisements among other users and providing a notification when such other users indicate an interest in any distributed advertisement. The method 700 involves presenting at least one system-selected or targeted advertisement to a first user at 710. At 720, at least one advertisement can be selected for more detailed viewing by the first user. The selected advertisement can be rated at 730. If the rating of such selected advertisement satisfies a threshold, the selected advertisement can be distributed to or shared with at least a second user.

At 740, the shared advertisement can be selected for more detailed viewing by the second user. Upon this selection, the first user (e.g., user who initiated the distribution) can be notified that the second user selected the shared advertisement. The notification can be made in a number of ways. For example, the first user can receive a message such as via email, instant messaging, or other messaging system. Alternatively, the shared advertisement can appear (or re-appear) on the first user's display with a message, symbol, color change or in a flashing manner to indicate that it has been selected by another user. The first user can also have the option to not receive any notifications or to receive notifications for only specified advertisements or users in the first user's social network. For instance, the first user may only be concerned with whether his/her spouse also showed an interest in a shared advertisement and may have no concern regarding any other user in his/her social network.

Figure 8:
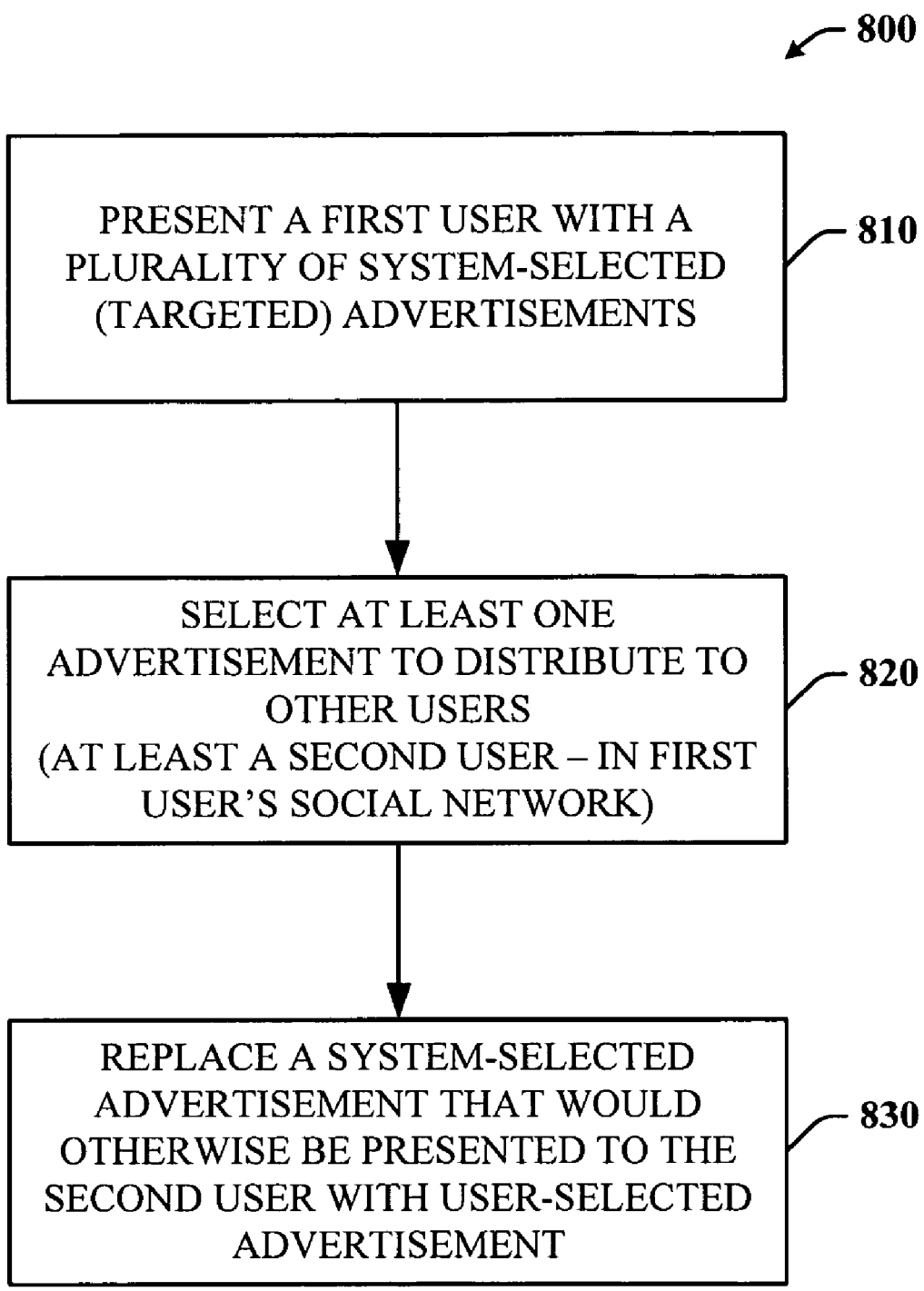
FIG. 8 is a flow chart illustrating an exemplary methodology that facilitates propagating advertisements between users within a social network at least in part by replacing system selected advertisements with user-selected advertisements in accordance with an aspect of the subject invention.

Turning now to FIG. 8, there is illustrated a flow diagram of an exemplary method 800 that facilitates replacing targeted advertisements with user-selected advertisements in accordance with an aspect of the subject invention. The method 800 involves presenting a first user with a plurality of system-selected (targeted) advertisements at 810. At 820, the first user can select at least a first advertisement for his/her personal viewing. In addition, the first user can select at least one other advertisement (e.g., second advertisement)—which may or may not be the same as the first advertisement—for distribution to at least a second user.

At 830, the user-selected advertisement can replace at least one system-selected advertisement that otherwise would have been presented to the second user. As a result, the second user can be presented with more suitable or more relevant advertisements that address his/her current or future interests.

Moreover, the propagation of user-selected advertisements among users who are relatively more familiar with one another's interests, desires, or needs can generate more advertising revenues for both the advertiser as well as the service provider. In addition, the users are presented with more relevant or interesting advertisements and may be more responsive to them as well.

Figure 9:
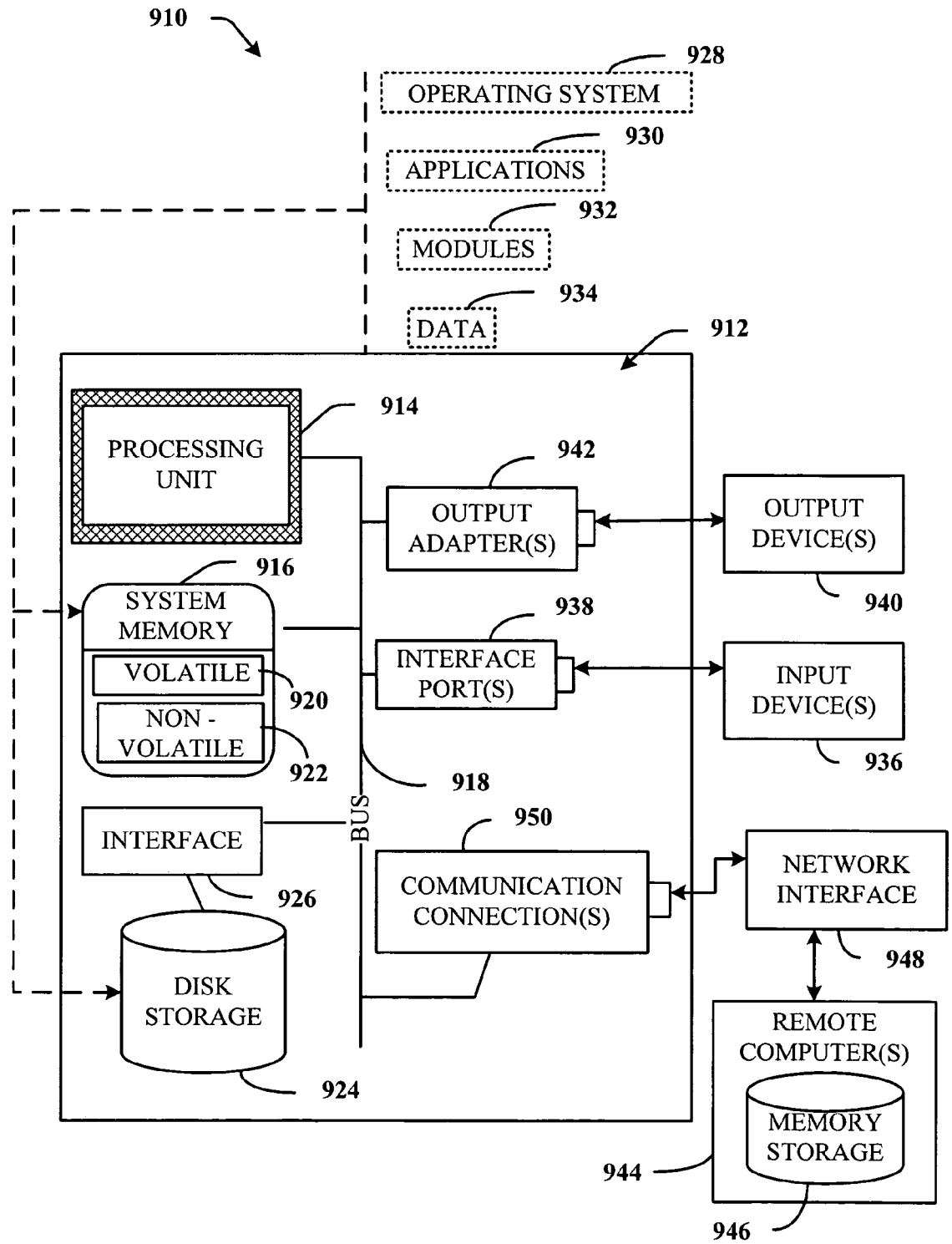
FIG. 9 illustrates an exemplary environment for implementing various aspects of the invention.

In order to provide additional context for various aspects of the subject invention, FIG. 9 and the following discussion are intended to provide a brief, general description of a suitable operating environment 910 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 910 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as static RAM (SRAM), dynamic RAM (DRAM), static DRAM (SDRAM), double data rate SDRAM (DDR SDRAM), enhanced SDRAM (ESDRAM), Synchlink DRAM (SLDRAM), and direct Rambus (DRDRAM).

Computer 912 also includes removable/nonremovable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the subject invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/ software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
a processor that executes the following computer executable components stored on a computer readable medium:
a propagation component that presents one or more advertisements to a first user of an interactive service for at least one of viewing or selection, wherein the propagation component provides at least a first and second user each with a chat window of the interactive service, wherein each of the chat windows provided define a text area and links to advertisements, and wherein advertisements associated with the links were selected for each user to whom the links were provided based on a profile of preferences of that user;
a selection component that enables the first user to select at least one of the one or more advertisements; and
a distribution component that distributes the at least one of the one or more advertisements selected by the first user to at least a second user of the interactive service when the first user selects the at least one of the one or more advertisements, wherein:
one or more advertisements are displayed within the chat window of the first user, and provided that a rating, based on preferences of the first user, of the one or more advertisements displayed in the chat window of the first user, exceeds a threshold value, one or more links, associated with the one or more displayed advertisements, are displayed within the chat window of the second user; and
a more detailed advertisement is displayed to the second user upon receipt of a click to a link distributed to the second user, and a copy of the clicked link is distributed to a chat window of a third user, wherein the third user is in a social grouping of the second user, but upon receipt of a click to the link by the third user, transfer of the link back to the first or second user is blocked unless a threshold period of time has passed.

2. The system of claim 1, wherein the selection component enables the first user to select the one or more advertisements for more detailed viewing.

3. The system of claim 1, further comprising a first notification component that notifies the first user when at least the second user has selected the at least one of the one or more advertisements for more detailed viewing.

4. The system of claim 3, wherein the first notification component notifies the first user in at least one of the following manners: flashing the at least one of the one or more advertisements on the first user's display or sending a message to the first user via at least one of a pop-up window or messaging system.

5. The system of claim 1, further comprising a second notification component that notifies at least the second user that the first user has selected the at least one of the one or more advertisements.

6. The system of claim 1, further comprising a rating component that rates the at least one of the one or more advertisements selected by the first user with a rating.

7. The system of claim 6, wherein the distribution component distributes the at least one of the one or more advertisements to the second user based on, at least in part, the rating of the advertisement.

8. The system of claim 1, further comprising an advertisement sale component that sells advertisement space to advertisers through auction bidding.

9. The system of claim 8, wherein the auction bidding is based in part on at least one of the following: cost per number of advertisements, cost per click of an advertisement, or cost per action.

10. The system of claim 1, further comprising an advertisement sale component that sells advertisement space to advertisers through negotiated prices.

11. The system of claim 1 employed in conjunction with at least one of a chat system, game system, email system, or messaging system.

12. An advertisement propagation system that facilitates presenting advertisements to a plurality of users of an interactive service comprising:
a processor that executes computer executable instructions stored on a computer readable medium;
according to the instructions executed by the processor:
providing at least a first and second user each with a chat window of the interactive service, wherein each of the chat windows provided define a text area and links to advertisements, and wherein advertisements associated with the links were selected for each user to whom the links were provided based on a profile of preferences of that user;
receiving a selection of an advertisement in the form of a click on one of the links provided to the first user;
rating the selected advertisement associated with the click by the first user, wherein the rating is based on the profile of the preferences of the first user;
distributing, to the second user, the link associated with the selected advertisement, wherein:
the click to the link by the first user results in display, within the chat window of the first user, of an advertisement associated with the clicked link, and results in display, within the chat window of the second user, of the link clicked by the first user; and
the rating, based on the profile of the preferences of the first user, of the advertisement associated with the clicked link, must exceed a threshold before the link can be distributed to the second user;
replacing an advertising selection, within the chat window of the second user, wherein the replaced advertising selection comprised a link to an advertisement selected based on a profile of the second user, and substituting the link distributed to the second user; and
upon receipt of a click to the link distributed to the second user, opening a more detailed advertisement within the chat window of the second user and displaying the clicked link in a chat window of a third user, wherein the third user is in a social grouping of the second user, but upon receipt of a click to the link by the third user, blocking transfer of the link back to the first user unless a threshold period of time has passed.

13. An advertisement propagation method comprising:
employing a processor to execute computer executable instructions stored on a computer readable medium to perform the following acts:
providing at least a first and second user each with a chat window of an interactive service, wherein each of the chat windows provided define a text area and links to advertisements, and wherein advertisements associated with the links were selected for each user to whom the links were provided based on a profile of preferences of that user;
enabling selection of one or more advertisements for more detailed viewing by the first user of the interactive service by receipt of a click of an associated link;
receiving a rating of the selected advertisement associated with the click by the first user, wherein the rating is based on preferences of the first user;
distributing the one or more advertisements selected by the first user to at least a second user of the interactive service, wherein:
one or more advertisements are displayed within the chat window of the first user, and provided that a rating, based on preferences of the first user, of the one or more advertisements displayed in the chat window of the first user, exceeds a threshold value, one or more links, associated with the one or more displayed advertisements, are displayed within the chat window of the second user; and
a more detailed advertisement is displayed to the second user upon receipt of a click to a link distributed to the second user, and a copy of the clicked link is distributed to a chat window of a third user, wherein the third user is in a social grouping of the second user, but upon receipt of a click to the link by the third user, transfer of the link back to the first or second user is blocked unless a threshold period of time has passed.

14. The method of claim 13, wherein rating the selected advertisements is based on, at least in part, user profile information.

15. The method of claim 13, further comprising notifying the first user that at least the second user has selected one or more distributed advertisements for more detailed viewing.

16. The method of claim 13, further comprising replacing at least one system-selected advertisement with at least one user-selected advertisement for distribution to at least the second user.

17. The method of claim 13, wherein the method is employed in at least one of a chat system, messaging system, game system, or email system.

18. The method of claim 13, further comprising presenting the first user with a plurality of system-selected advertisements from which to choose for at least one of the following: more detailed viewing or replacing a system-selected advertisement that otherwise would be presented to the second user with at least one of the plurality of system-selected advertisements chosen by the first user.

19. The system of claim 9, wherein the action comprises at least one of purchase of an advertised good; sale of an advertised good; purchase of an advertised service; or sale of an advertised service.

20. The system of claim 1, wherein the interactive service comprises an internet communication service.

21. The system of claim 1, wherein the at least one of the one or more advertisements selected by the first user are distributed within the first user's social network, wherein the first user's social network is determined, at least in part, by at least one of the following: users of the interactive service currently engaged in communications with the first user; at least one of a contact list or address book of the first user; or at least one of email addresses or usernames specified by the first user.

22. The system of claim 21, wherein the advertisements distributed within the first user's social network are distributed via at least one of a chat system, game system, email system, or messaging system.

23. The system of claim 1, further comprising an advertisement tracking component that blocks users from receiving the same advertisement within a specified period of time, wherein the specified period of time comprises at least one of minutes, hours, days, weeks, or any other time increment or period.

* * * * *